United States Patent Office
3,200,007
Patented Aug. 10, 1965

3,200,007
METHOD FOR MAKING A MAGNETIC
RECORDING MEDIUM
Dervin L. Flowers, Redwood City, Calif., assignor to Ampex Corporation, Redwood City, Calif., a corporation of California
No Drawing.   Filed Oct. 24, 1962, Ser. No. 232,853
1 Claim.  (Cl. 117—138.8)

This invention relates to a novel polymer system and more particularly relates to a novel polymer system for forming a thermosetting binder for a recording tape containing magnetic particles.

It is known that extremely finely divided cobalt particles can be produced by introducing a toluene solution of cobalt carbonyl into a solution of toluene containing dissolved therein a polymer mixture. The exact mechanism of the reaction is not known, but after the reaction is complete, the cobalt metal is formed as finely divided particles (e.g., 350–400 A.), each of which is encapsulated in plastic. A typical polymer starting material comprises copolymerized methyl methacrylate, ethyl acrylate and vinyl pyrrolidone. When one attempts to prepare a magnetic tape with such a composition, a tape can be made with fairly good magnetic properties but unacceptable mechanical properties. Although the latter deficiency can be partially offset by the addition to the micro-metallic dispersion of other prepolymers and/or polymers which are reactive with each other, this is not fully satisfactory since heavy metal loading is impossible and since the tapes heretofore produced by such a process still have poor wear properties.

In contrast, the polymer of the present invention is one which is reactive with the cobalt carbonyl so that dispersions containing a high percentage of metal can readily be obtained, and furthermore the polymer of this invention contains reactive hydroxyl groups so that after the dispersion is prepared it can be directly reacted with other materials, such as isocyanates, to produce a long-wearing tape which has heavy metal loading and which is fully satisfactory from both a magnetic and a mechanical standpoint. Further, it has been found that the polymer composition of the present invention is capable of yielding larger cobalt particles than the compositions heretofore used. In addition, the degree of chaining and agglomeration of the cobalt particles appears to be decreased. Additional advantages of the polymer of the present invention are than the remanence ratio $Br/Bm$ or "squareness" of the B-H loop is increased over tapes made without functional groups in the encapsulating polymer, and the coercivity is greatly increased over tapes made with other encapsulating agents.

It is therefore an object of the present invention to produce a novel polymer system which is capable of yielding magnetic recording tapes of improved mechanical and electrical properties.

Another object of this invention is to produce a polymer system which is capable of synthesis and encapsulation of extremely fine cobalt particles from cobalt carbonyl for use on magnetic tape.

A further object of this invention is to provide a novel polymer system having functional hydroxyl groups so that after incorporating magnetic particles in the polymer, the material can be further polymerized with other reagents to form a tough, thermosetting binder.

Another object of this invention is to provide a novel polymer system which will react with cobalt carbonyl to yield larger cobalt metal particles than systems heretofore employed.

Another object of this invention is to provide a novel polymer system wherein the degree of chaining and agglomeration of cobalt particles is decreased.

A still further object of this invention is to provide a polymer system which yields tapes capable of having a high remanence ratio.

An additional object of this invention is to provide a novel polymer system which gives tapes of greatly increased coercivity.

The novel polymer of the present invention is made from the following monomers:

A. 10–95% by weight of a member selected from propyl, isopropyl and butyl methacrylate or mixtures thereof;

B. 1–25% by weight of a hydroxyl acrylate of the formula:

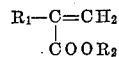

where $R_1 = H$ or $CH_3$ and

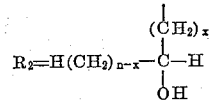

$n$ being chosen from 1 to 10 and $X = 0$ to $n$.  2-hydroxy ethyl acrylate, 2-hydroxy propylacrylate, 4 hydroxy hexyl methacrylate and 6 hydroxy octyl acrylate are typical examples of suitable compounds.

C. 0.01–10% by weight of a copolymerizable nitrogen-containing monomer such as N-vinyl-2-pyrrolidone or 2-methyl-5-vinyl pyridine.

In addition, other components can be made part of the polymer system such as:

D. 0–25% by weight of ethyl, propyl, isopropyl or butyl acrylate;

E. 0–25% by weight of 2-ethyl hexyl acrylate or methacrylate or a higher ester alcohol such as the acrylates or methacrylates of octyl, decyl, dodecyl, octadecyl or the like.

Copolymerization is achieved by mixing the components together with a suitable catalyst and heating to an elevated temperature for about 5 to 16 hours. Temperatures of about 120° C. are suitable, although somewhat higher or lower temperatures can be used with a corresponding increase or decrease in reaction time. Although the reaction will go merely in the presence of light or heat, it is preferred to use a catalyst such as 2,2'-azo-bis-isobutyronitrile, benzoyl peroxide, ditert. butyl peroxide and similar free radical catalysts such as are well known to those skilled in the art.

After the polymer system of the present invention is made, a magnetic pigment such as finely divided gamma ferric oxide can be incorporated therein by ball milling to produce a pigmented polymer. However, it is preferred to incorporate finely divided magnetic material such as iron or cobalt or any ferromagnetic alloy into the polymer by the technique above described wherein a carbonyl is reacted with the nitrogen-containing component of the polymer system to produce a toluene solution of the polymer system with finely divided, encapsulated metal therein, as is later described in detail. After the material has been pigmented, either by admixture with ferric oxide or by reaction to produce metal therein, the mixture is ordinarily treated to remove surplus polymer. The reason for this is that only a portion of the polymer is necessary for the suspension of the magnetic pigment and a higher metal loading can be achieved by removing the surplus polymer. However, this step is not necessary and can be omitted if a lower metal loading is desired or can be tolerated. The material then can be mixed with an isocyanate such as 2,4-toluene diisocyanate, hexamethylene diisocyanate, or 3,3'-dimethyl diphenyl methane-4,4'-diisocyanate. The isocyanate reacts to form a thermosetting polyurethane.

The following non-limiting examples illustrate preferred methods of practicing the process of the present invention:

*Example 1*

Thoroughly mix: G.

N-vinyl-2-pyrollidone _____ 0.65
2-hydroxyl propyl methacrylate _____ 3.90
Octyl/decyl* methacrylate _____ 6.05
Butyl methacrylate _____ 54.40
Toluene _____ 65.0

* Octyl/decyl methacrylate monomer is an approximately 50/50 mixture of octyl and decyl methacrylate.

Purge mixture with nitrogen for 10 minutes, then add 0.23 g. of ditertiary butyl peroxide, seal, and heat to 120° C. Reaction time is 16 hours. The resulting polymer was precipitated by methanol and dried under vacuum. Yield was 85% w. The dried copolymer was then dissolved in toluene to make a toluene solution containing 1.5% of the copolymer. In a separate vessel a toluene solution was made by bubbling gaseous cobalt carbonyl into the toluene until the solution contained 4.5% by weight of cobalt carbonyl. The two toluene solutions were then mixed at room temperature and heated to toluene reflux temperature at atmospheric pressure for 12 hours. The solution turned black and contained 6% solids in the toluene. The toluene was then removed, resulting in a mass which contained 75% by weight of cobalt metal. The solution was then centrifuged and washed with successive increments of a solvent consisting of half methyl ethyl ketone and half toluene until the solid material remaining comprised 92% cobalt metal encapsulated in the polymer. A sufficient quantity of toluene diisocyanate or diisocyanate prepolymer was then added to reduce the metal content to 75%. The reaction is rapid at room temperature but the material can be placed in a ball mill for a short period of time to secure thorough mixing. A Mylar tape (polyethylene terephthalate polymer) was then coated with the mixture and passed through an oven. The tape was sufficiently hard upon being passed through the oven to be wound and was fully cured on standing for 12 hours at room temperature. Although it is ordinarily not necessary or desirable to use a catalyst, if quicker curing is desired any of the usual diamines or triamines or tin compounds such as are well known in the polyurethane foam art can be employed.

In the following additional examples, only the preparation of the polymer is given, it being understood that the polymer can be reacted with cobalt carbonyl or merely mixed with a magnetic pigment and then reacted with a diisocyanate to produce the final coating.

*Example 2*

Thoroughly mix: G.

N-vinyl-2-pyrollidone _____ 0.65
2-hydroxy propyl methacrylate _____ 1.95
Ethyl acrylate _____ 12.50
Butyl methacrylate _____ 49.90
Toluene _____ 65.0

Purge mixture with nitrogen for 10 minutes, then add 0.23 g. of ditertiary butyl peroxide, seal, and heat for 5 hours at 120° C. Resulting polymer was precipitated by methanol and dried under vacuum. Yield 60% w.

*Example 3*

Thoroughly mix: G.

2-methyl-5-vinyl pyridine _____ 0.82
2-hydroxy propyl methacrylate _____ 3.90
Stearyl methacrylate _____ 3.02
Butyl methacrylate _____ 57.43
Toluene _____ 65.0

Purge mixture for 10 minutes with nitrogen, then add 0.23 g. of ditertiary butyl peroxide, seal, and heat at 120° C. for 16 hours, precipitating with 10 volumes of methanol. Yield 85% w.

The following additional examples illustrate other compositions falling within the scope of the invention. The method of preparation was the same as Example 2 in each instance.

BMA—butyl methacrylate
MMA—methyl methacrylate
EA—ethyl acrylate
O-DMA—octyl/decyl methacrylate
SMA—Stearyl methacrylate
NVP—N-vinyl pyrollidone
HPMA—hydroxy propyl methacrylate

| Example | Composition (Relative Percent) | | | | | | | Percent yield | Percent Solvent |
|---------|------|------|------|-------|------|-----|------|--------------|-----------------|
|         | BMA  | MMA  | EA   | O-DMA | SMA  | NVP | HPMA |              |                 |
| 4       | 48   | 48   | 0    | 0     | 0    | 1   | 3    | 82.5         | 50              |
| 5       | 48   | 48   | 0    | 0     | 0    | 1   | 3    | 80.9         | 60              |
| 6       | 48   | 48   | 0    | 0     | 0    | 1   | 3    | 58.5         | 70              |
| 7       | 96   | 0    | 0    | 0     | 0    | 1   | 3    | 68           | 50              |
| 8       | 95   | 0    | 0    | 0     | 0    | 1   | 4    | 77           | 50              |
| 9       | 93   | 0    | 0    | 0     | 0    | 1   | 6    | 68           | 50              |
| 10      | 76.8 | 0    | 19.2 | 0     | 0    | 1   | 3    | 70           | 50              |
| 11      | 67.2 | 0    | 28.8 | 0     | 0    | 1   | 3    | 70           | 50              |
| 12      | 57.4 | 0    | 38.6 | 0     | 0    | 1   | 3    | 70           | 50              |
| 13      | 83.6 | 0    | 9.4  | 0     | 0    | 1   | 6    | 70           | 50              |
| 14      | 74.4 | 0    | 18.6 | 0     | 0    | 1   | 6    | 70           | 50              |
| 15      | 64.0 | 0    | 29.0 | 0     | 0    | 1   | 6    | 70           | 50              |
| 16      | 88.35| 0    | 0    | 0     | 4.65 | 1   | 6    | 89           | 50              |
| 17      | 83.70| 0    | 0    | 0     | 9.30 | 1   | 6    | 87           | 50              |
| 18      | 79.05| 0    | 0    | 0     | 13.95| 1   | 6    | 90           | 50              |
| 19      | 88.35| 0    | 0    | 4.65  | 0    | 1   | 6    | 77           | 50              |
| 20      | 83.70| 0    | 0    | 9.30  | 0    | 1   | 6    | ------       | 50              |
| 21      | 79.05| 0    | 0    | 13.95 | 0    | 1   | 6    | 88           | 50              |
| 22      | 64.9 | 0    | 38.6 | 0     | 0    | 0.1 | 3    | 80           | 50              |
| 23      | 69.3 | 0    | 19.7 | 0     | 0    | 1   | a 10 | 67           | 50              |
| 24      | 73.4 | 0    | 15.6 | 0     | 0    | 1   | b 10 | 62           | 50              | a 4 hydroxy hexyl methacrylate substituted for HPMA.
b 6 hydroxy octyl methacrylate substituted for HPMA.

Tapes made in accordance with the process of the present invention have coercivities on the order of 600 to 750 oersteds as compared with cobalt-containing tapes made without the hydroxy component of the prepolymer which run from 420 to 450 oersteds and ordinary tapes made with ferric oxides which have a coercivity on the order of 300 to 325 oersteds.

What is claimed is:

The process of making a magnetic recording medium comprising precipitating and encapsulating metallic cobalt to form finely dispersed cobalt particles in a polymer matrix by reacting a cobalt carbonyl solution with a polymer mixture made by reacting together from 10 to 95% by weight of a member selected from the group consisting of propyl
isopropyl and
butylmethacrylate, and
mixtures thereof, from 1 to 25% by weight of a compound of the formula

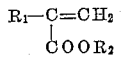

where $R_1$ is selected from the group consisting of H and $CH_3$
and

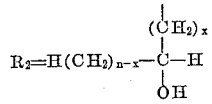

$n$ being chosen from 1 to 10 and $x=0$ to $n$; and from 0.01 to 10% by weight of a member selected from the group consisting of N-vinyl-2-pyrrolidone and
2-methyl-5-vinyl pyridine;

reacting the metal-containing polymer thus produced with a member selected from the group consisting of 2,4-toluene diisocyanate, hexamethylene diisocyanate and 3,3'-dimethyl diphenyl methane-4,4'-diisocyanate to produce a material containing about 75% cobalt and applying the same to a plastic backing member.

References Cited by the Examiner

UNITED STATES PATENTS

| | | | |
|---|---|---|---|
| 2,537,626 | 1/51 | Eberly et al. | 260—80.5 |
| 2,568,659 | 9/51 | Powell | 260—80.5 |
| 2,783,208 | 2/57 | Katz | 252—62.5 |
| 2,936,287 | 5/60 | Kazenas | 252—62.5 |
| 3,014,818 | 12/61 | Campbell | 252—513 |
| 3,073,785 | 1/63 | Angelo | 252—513 |

TOBIAS E. LEVOW, *Primary Examiner.*

MAURICE A. BRINDISI, *Examiner.*